AMPLITUDE DISCRIMINATING SEPARATOR/AMPLIFIER

Filed Dec. 15, 1958

INVENTOR.
THOMAS W. CHAPMON
BY Marvin Moody
ATTORNEY
R W Anderson
AGENT

United States Patent Office 3,056,090
Patented Sept. 25, 1962

3,056,090

AMPLITUDE DISCRIMINATING SEPARATOR/AMPLIFIER

Thomas W. Chapmon, Dallas, Tex., assignor to Collins Radio Company, Cedar Rapids, Iowa, a corporation of Iowa Filed Dec. 15, 1958, Ser. No. 780,324
3 Claims. (Cl. 328—115)

This invention relates generally to signal amplitude discriminators and more particularly to a novel signal amplitude discriminator-amplifier.

Amplitude selective circuitry is widely employed in the art and known types include clamping devices, such as biased diodes or triode clamping circuits wherein only incoming pulses exceeding a predetermined amplitude are passed. Such circuitry performs an amplitude discriminating function that generally critically depends upon a clamping bias source and unreliably depends upon stable tube operating characteristics. In circuits to be used for the purpose of selective amplification based upon amplitude, a need arises for improving the reliability and accuracy therein by careful maintenance of the amplitude "pick-off" point. This accuracy is desirable, for example, in the selective amplification of range marks generated by a ringing oscillator, or in television sync circuitry for pulse separation purposes. Ofttimes it becomes additionally desirable to provide for pulse amplitude discrimination combined with an amplification function whereby pulses exceeding preselected amplitude levels may be passed and wherein the pulses so passed are at the same time amplified.

It is an object, therefore, of the present invention to provide an amplitude selective amplifier, passing only those incoming signals which exceed a preselected amplitude to the exclusion of other incoming signals and by which the chosen signals are amplified.

A further object of the present invention is the provision for a selective amplifier having a dual output, the first output of which is an amplified version of the incoming signal in its entirety, and the second output of which is an amplified version of only those portions of the incoming signals exceeding a "pick-off" amplitude.

A still further object of the present invention is the provision of an amplitude discriminating amplifier of a bias means by which pick-off stability may be realized and which may additionally provide an automatic gain control characteristic for the purpose of maintaining said pick-off point at an exact predetermined level.

A further object of the invention is the provision of a pulse amplitude discriminator-amplifier which maintains an accurate amplitude discriminating function over wide ranges of incoming signal characteristics such as random amplitudes, durations and intervals.

The invention is featured in the provision of a common bias means for a pair of electron discharge devices whereby the bias one of said devices is determined by the cumulative effects of the incoming signal amplitude per se simultaneously added to a percentage function of the plate voltage of the other discharge device.

These and other features and objects of the invention will become apparent from the following description and claims in conjunction with the accompanying drawing, in which:

Figure 1:
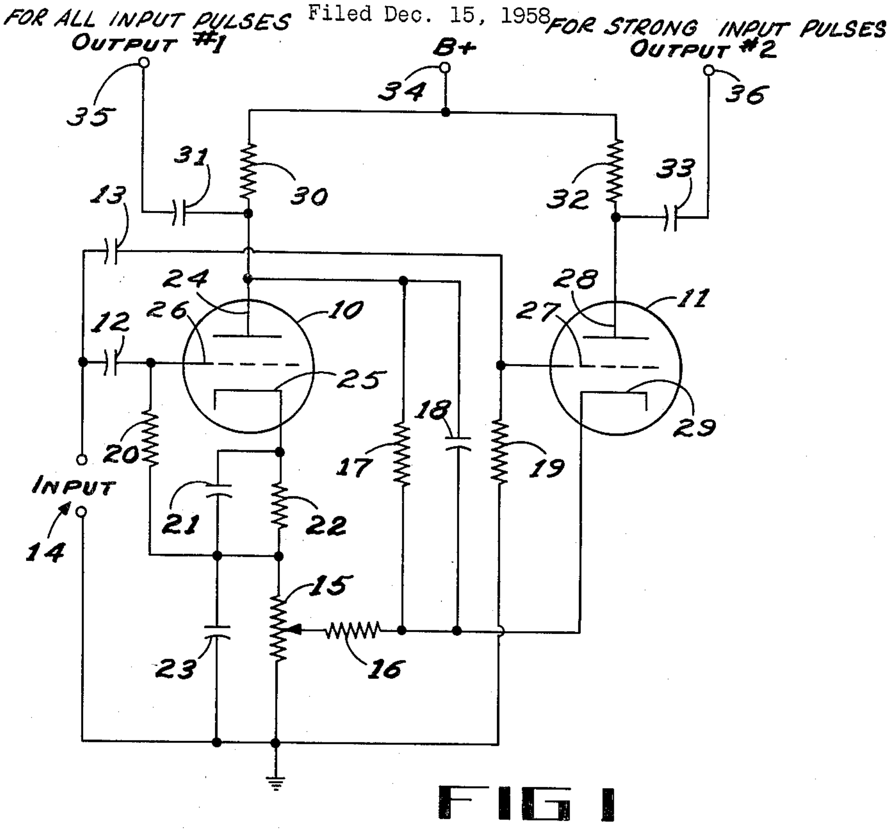
FIGURE 1 is a schematic diagram of the embodiment of the invention.

With reference to FIGURE 1, the circuitry is seen to employ two amplifier stages, each comprising an electron discharge device illustrated respectively as triodes 10 and 11. Input signals which might be of the form illustrated in FIGURE 2(*a*) are applied at input terminals 14 through a capacitor 12 to the grid 26 of tube 10 and simultaneously through capacitor 13 to the grid 27 of tube 11. The plates 24 and 28 of the tubes 10 and 11 are connected through load resistors 30 and 32 respectively to a B plus supply 34. A first output is taken from the plate 24 of tube 10, through capacitor 31 to terminal 35. A second output is taken from the plate 28 of tube 11, through capacitor 33 to terminal 36.

The cathode 25 of tube 10 is connected through resistance-capacitance biasing networks 21—22 and 23—15 to common ground. A grid leak resistor 20 is connected between the grid 26 of tube 10 and the junctions of capacitors 21 and 23 and resistors 22 and 15.

The circuit of tube 11 is seen to be essentially a cathode-driven amplifier modified to allow the grid to be driven also. The grid 27 of tube 11 is returned to common ground through resistor 19, while the cathode 29 thereof is returned to ground through resistor 16 and a portion of resistor 15. Plate 24 of tube 10 is coupled to the cathode 29 of tube 11 through the parallel network of resistor 17 and capacitor 18.

Tube 10 is in most respects a typical amplifier with the exception that the plate supply is somewhat less than B plus due to resistance 15 in the cathode return. It is noted that resistors 17 and 16 and a portion of resistor 15 form a voltage divider network from the plate 24 of tube 10 to common ground through which the cathode 29 of tube 11 is connected. The parameters associated with tube 10 are so chosen that tube 10 is conducting in the absence of input signals and resistor 22 and capacitor 21 provide a self-bias arrangement on tube 10 as a function of the quiescent current therethrough. It is noted that the current flow through tube 10 additionally flows through resistor 15 which is shunted by a capacitor 23. Thus a positive voltage is applied from the tap of resistor 15 through resistor 16 to the cathode 29 of tube 11. Resistors 17 and 16 and a preselected portion of resistor 15, as mentioned above, form a voltage divider network from the plate of tube 10 to common ground. The cathode 29 of tube 11 is, therefore, biased above ground depending upon the plate voltage of tube 10 and the current flow through resistor 15. Under quiescent conditions, that is in the absence of incoming pulses, the current flow through tube 10 is sufficient to bias the cathode of tube 11 below cutoff. The amount of bias can be precisely set by adjustment of the tap on resistor 15. Capacitor 23 which shunts resistance 15 insures that the bias on tube 11 is not affected by the presence of input pulses to tube 10.

Figure 2:
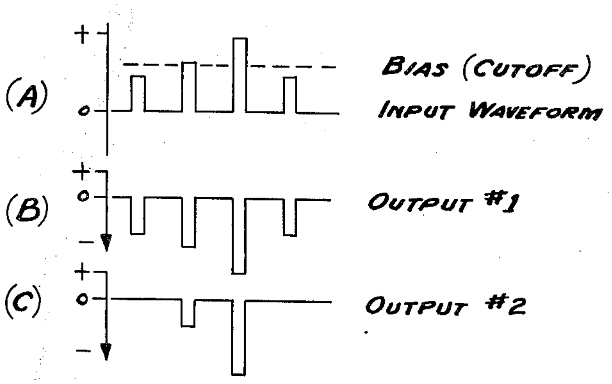
FIGURE 2 is an illustration of typical input and output waveforms of the circuit in FIGURE 1.

In operation, a series of pulses, such as illustrated in FIGURE 2(*a*), might be applied as input to terminals 14 and it may be assumed that only the second and third pulses in the pulse train illustrated are to be selectively passed and amplified. The dotted "bias" line illustrated in FIGURE 2(*a*) is figurative only in that it indicates an incoming pulse amplitude which will, in conjunction with the resulting cathode bias of tube 11, cause tube 11 to conduct. With the application of positive-going input pulses to the grid 26 of tube 10, the resulting increase in conduction causes the plate voltage to drop accordingly. This negative-going plate pulse is reflected as a percentage voltage drop on the cathode of tube 11 such that the cathode 29 is accordingly less positive during the presence of the incoming pulse. This is apparent since the cathode of tube 11 is biased above ground in accordance with the voltage at the junction of resistors 17 and 16. Thus with the application of input pulses to grid 26, the resulting drop in the plate voltage of tube 10 is seen to effectively reduce the positive bias applied to the cathode of tube 11, while, simultaneously, the positive input pulse is applied through capacitor 13 directly to the grid of tube 11 so as to further raise the bias on tube 11. Thus the combined effect of the drop in tube 10 plate voltage as applied to the cathode of tube 11 with the direct application of the positive incoming pulse to the grid of tube 11 is cumulative in raising the bias in tube 11 to cause conduction and the presence of pulses at output terminal 36 corresponding to those incoming pulses exceeding the preselected level as determined by the setting of the slider on resistor 15. In the example illustrated, the output from terminal 36 would be that of the second and third incoming pulses in inverted form as illustrated in FIGURE 2(*c*). An output may be taken directly from the plate tube 10 at terminal 35 which would correspond to an amplified and an inverted form of the complete train of incoming pulses, such as illustrated in FIGURE 2(*b*). This dual output, one being selective and the other nonselective, may be readily adaptable to select and cancel a signal with the addition of an inverter and combiner circuit.

Resistor 17 which forms a part of the voltage divider network determining the bias on cathode 29 of tube 11 is seen to be shunted by capacitor 18. Resistors 17 and 16 function as a voltage divider across the plate of tube 10; the resultant voltage applied to the cathode of tube 11 being divided accordingly, as previously discussed. Capacitor 18 and resistor 16 also function as a voltage divider that is frequency sensitive; that is, voltage across resistor 16 is greater at high frequencies and the voltage across capacitor 18 is greater at low frequencies. The addition of capacitor 18 aids in retaining the leading edges of pulses amplified by tube 10 due to this frequency selected action.

Due to the common cathode biasing arrangement of the tubes 10 and 11, the circuit may be adapted to exhibit AGC action which tends to stabilize the bias setting when pulses of random and repetitious rates are applied as input. This feature is desirable in applications such as television sync circuits, for example. The AGC action may be defined as follows: Capacitor 23 which shunts resistor 15 in the cathode circuit of tube 10 was discussed as being of sufficient value that input pulses to tube 10 would not affect the cathode bias on tube 11 as set by resistor 15. Normally, the current change through tube 10 in the presence of incoming pulses is insufficient to charge capacitor 23 due to the time constant of capacitor 23 and the plate resistance of tube 10. However, should the value of capacitor 23 be decreased somewhat, an AGC action becomes evident due to the increase in positive voltage across resistor 15 when the amplitude of the input pulses causes tube 10 to draw sufficient current to begin charging capacitor 23. Increasing the value of positive voltage across resistor 15 during application of an incoming pulse would be reflected as an increased positive bias on the cathode of tube 11 and thus a correspondingly larger value of pulse amplitude would have to be applied to the grids of tube 11 to overcome the cut-off condition of tube 11.

The invention is thus seen to provide an amplitude-selective amplifier providing a first output for a normal signal and a second output for signals above a preselected pick-off amplitude and in which a novel biasing means enables the provision of an automatic gain control characteristic for accurate maintenance of a preselected pick-off amplitude.

Although this invention has been described with respect to a particular embodiment thereof, it is not to be so limited as changes and modifications may be made therein which are within the full intended scope of the invention as defined by the appended claims.

I claim:

1. A pulse amplitude discriminating amplifier for selective amplification of pulses exceeding a predetermined amplitude comprising first and second electron tubes each having at least a grid, a cathode and a plate, means for substantially simultaneously coupling said input pulses to the grids of each of said tubes, means for biasing said second tube as a function of the quiescent current flow in the cathode circuit of said first tube, said biasing means comprising a resistive means serially connected between the cathode of said first tube and common ground, bypass means for said resistive means whereby the voltage drop thereacross is substantially unresponsive to increased current flow through said first tube with application of input signals to the grid thereof, the cathode of said second tube returned to said common ground through a preselected portion of said resistive means, and further biasing means connected between the cathode of said second tube and the plate of said first tube whereby the cathode of said second tube is biased with respect to said common ground as a predetermined percentage function of the voltage from the plate of said first tube to said common ground.

2. A pulse amplitude discriminating amplifier comprising first and second electron tubes each having at least a cathode, a grid and a plate electrode, positive input pulses applied simultaneously to the grids of said first and second tubes, the plates of said tubes connected through individual load elements to a plate supply source, biasing means associated with the cathode of said first tube comprising first and second resistors respectively connected from said cathode to ground, the cathode of said second tube connected through a third resistor and a predetermined portion of said second resistor to ground, said first and second resistors shunted respectively by first and second capacitors, the grid of said first tube connected through a fourth resistance to the junction of said first and second resistances, the grid of said second tube connected through a fifth resistance to ground, the plate of said first tube connected through a sixth resistor to the cathode of said second tube, said sixth resistor being shunted by a third capacitor, the cathode-to-grid bias of said second tube being a direct function of the instantaneous plate voltage of the first tube and the quiescent current flow therethrough cumulatively combined with the amplitude of said input pulses, the conductivity of said second tube being selectively effected by application of input pulses exceeding a predetermined amplitude by preselection of the portion of said second resistor common to the cathode return circuits of each of said tubes.

3. An amplitude discriminating amplifier for selectively passing and amplifying incoming pulses exceeding a predetermined amplitude comprising first and second electron tubes each having at least a cathode, a grid and a plate electrode, a voltage divider network connected from the plate of said first tube to common ground, said network comprising a plurality of resistive elements, an adjustable portion of said voltage dividing network additionally serially connected between the cathodes of both tubes and common ground, cathode bias means for said first tube, said first tube cathode bias means rendering said first tube quiescently non-conductive, means for applying said incoming pulses simultaneously to the grids of each of said first and second tubes, said second tube being biased below cutoff by the quiescent voltage drop across said adjustable portion of said voltage divider network, the application of said incoming pulses to the grid of said second tube being cumulatively effective with the simultaneous change of voltage on the cathode thereof to effect conduction in said second tube of those portions of said incoming pulses exceeding said predetermined amplitude, said predetermined amplitude being selectable by said adjustable portion of said voltage dividing network.

References Cited in the file of this patent

UNITED STATES PATENTS

| | | |
|---|---|---|
| 2,066,047 | Mathes | Dec. 29, 1936 |
| 2,296,626 | Blumlein | Sept. 22, 1942 |
| 2,538,772 | Ferrill | Jan. 23, 1951 |
| 2,539,374 | Pourciau et al. | Jan. 23, 1951 |
| 2,605,402 | Coleman | July 29, 1952 |
| 2,708,687 | Schlesinger | May 17, 1955 |